(No Model.)

C. R. PATTERSON.
THILL COUPLING.

No. 364,849. Patented June 14, 1887.

Attest.
J. S. Carpenter
E. A. Bell

Inventor.
Charles R. Patterson.
by James H. Layman
Atty.

N. PETERS. Photo-Lithographer, Washington, D. C.

UNITED STATES PATENT OFFICE.

CHARLES R. PATTERSON, OF GREENFIELD, OHIO.

THILL-COUPLING.

SPECIFICATION forming part of Letters Patent No. 364,849, dated June 14, 1887.

Application filed March 12, 1887. Serial No. 230,600. (No model.)

*To all whom it may concern:*

Be it known that I, CHARLES R. PATTERSON, a citizen of the United States, residing at Greenfield, in the county of Highland, State of Ohio, have invented certain new and useful Improvements in Thill-Couplings, of which the following is a specification, reference being had therein to the accompanying drawings.

My invention comprises a novel anti-rattler that can be readily applied to an ordinary thill-coupling, the construction of said device being as follows: The tie-plate of the clip, wherewith the thill-coupling is secured to the front axle, has a forward prolongation or extension, whose extreme end serves as a bearing or fulcrum for a spring to rest against, which spring is practically the shape of a reversed letter S, the upper limb of said spring being so curved as to surround a portion of the periphery of the thill-iron hub. The lower limb of this spring is slotted or pierced to admit an adjusting device projecting downwardly from the tie-plate, in order that any tightening of said device will cause the upper limb of said spring to bear upon the thill-iron hub with any desired pressure that will prevent rattling of the various parts of the coupling. This adjusting device may be arranged in several different ways, as hereinafter more fully described.

Figure 1:
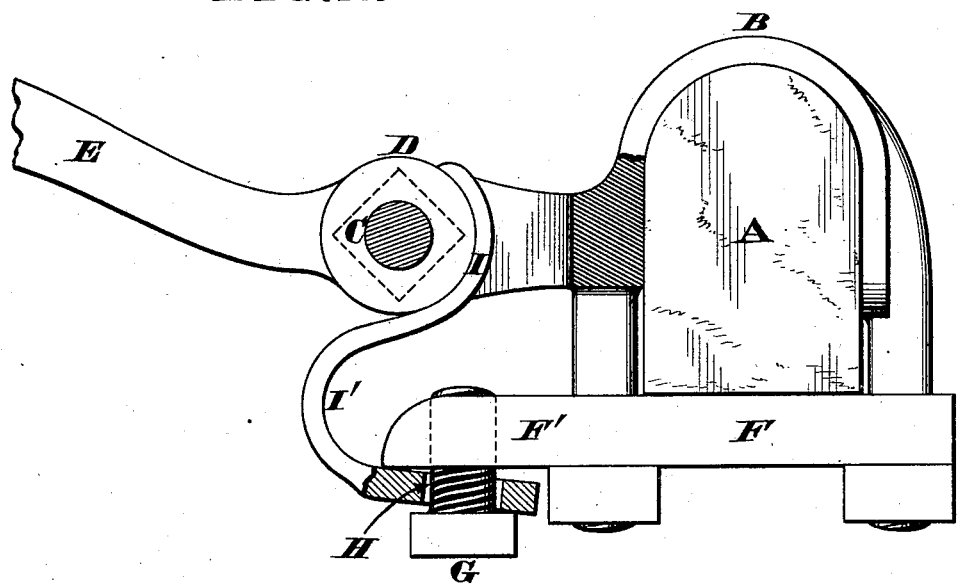
Figure 2:
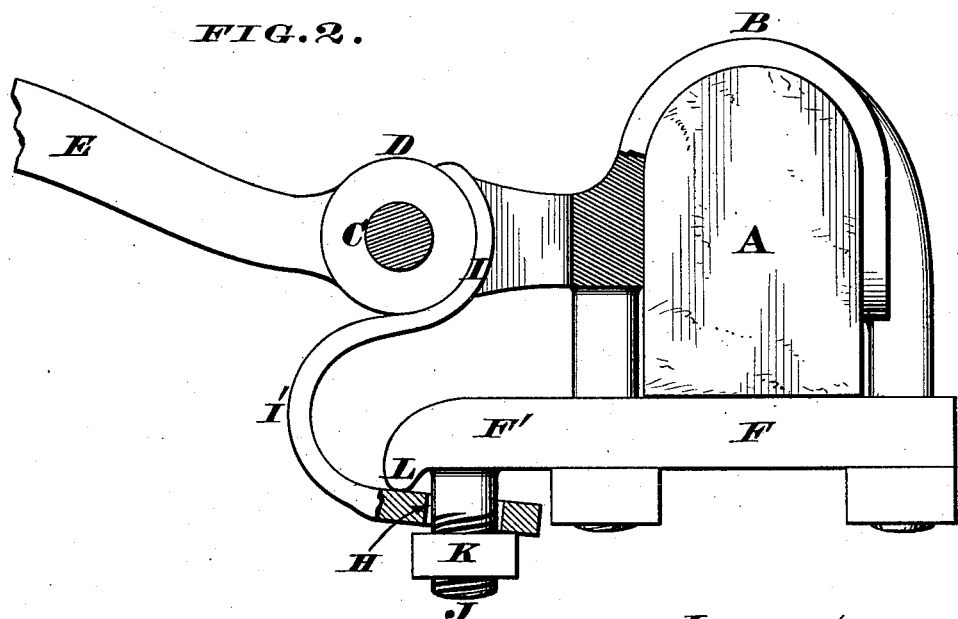

In the annexed drawings, Figure 1 is a vertical section of my improved thill-coupling. Fig. 2 is a similar section of a modification of my invention.

A represents the front axle of a vehicle, B an ordinary clip surrounding the same, and C is the bolt or pivot of said clip, which bolt traverses the cylindrical hub D of the thill-iron E, said bolt being retained in place by the usual nut, (indicated by the dotted lines in Fig. 1.)

F represents the tie-plate ordinarily used for fastening the clip to the axle, said tie-plate having a forward extension or prolongation, F', to receive an adjusting device, which is here shown as a bolt or screw, G, tapped into said extension. This bolt or equivalent device traverses a slot or eye, H, in the lower limb, I', of a spring, I I', whose shape is practically that of a reversed letter S. The upper limb, I, of this spring is so curved as to fit snugly around a portion of the periphery of the cylindrical hub D, while the lower limb, I', is adapted to bear against the front edge of the extension F'. Owing to this arrangement of the various parts of the thill-coupling, the front end of extension F' serves as a fulcrum for the limb I' of the spring to bear up against, which spring now acts as a bent lever having some degree of elasticity. Consequently, when the bolt G is tightened, thereby drawing the lower limb, I', up toward the extension F', the upper limb, I, of the spring must be pulled down and caused to exert a greater or less pressure upon the hub D, which pressure can be regulated by properly adjusting said bolt or screw. It is evident this pressure prevents any possible rattling of the coupling, while at the same time the thill-iron E is free to give with the motions of the horse or other animal hitched to the vehicle.

In the modification of my invention, as seen in Fig. 2, the extension F' of the tie-plate has a screw-threaded lug, J, depending rigidly therefrom, which lug traverses the slot H of spring I I', and has a nut, K, engaged with its lower end. Furthermore, this illustration shows the extension F', having a downward bend, L, that affords a rounded or gradual bearing for the spring I I' to bear against. This modification operates precisely like the device seen in Fig. 1—that is to say, any pressure brought to bear against the lower limb of the spring will cause a corresponding pressure of the upper limb of the same against the thill-hub.

I am aware of the thill-couplings seen in Ile's Patent, No. 181,848, Saul's Patent, No. 330,051, and Hindmarsh & Gwinn's Patent, No. 348,014, all of which show springs bearing against thill-iron hubs and screws for adjusting the tension of said springs. Therefore my claims are not designed to be construed broadly, but are expressly limited to the specific construction herein shown and described.

I claim as my invention—

1. The combination, in a thill-coupling, of a reversely-curved spring, the upper limb of which bends around a portion of the thill-iron hub, while its lower limb fulcrums against the under edge of a forward extension of the clip-tie plate, said lower limb being perforated to receive an adjusting device depending from said forward extension, in order that the tightening of this device will cause the upper limb of said spring to bear down upon the top of the thill-iron hub, as herein described.

2. The combination, in a thill-coupling, of the clip B, pivot C, thill-iron hub D, tie-plate F, forward extension F', bolt G, and reversely-curved spring I I', the upper limb, I, of said spring being bent around a portion of said hub D, while the lower limb, I', fulcrums against the lower edge of said extension F', and is perforated at H to admit the bolt G, in order that the tightening of the latter will cause the upper limb, I, to bear down upon the top of hub D, as herein described.

In testimony whereof I affix my signature in presence of two witnesses.

CHARLES R. PATTERSON.

Witnesses:
JACOB ZINNECKER, Jr.,
J. F. WILSON.